United States Patent
Chiocchi et al.

(10) Patent No.: US 12,090,848 B2
(45) Date of Patent: Sep. 17, 2024

(54) INTERFACE FOR CONTROLLING AT LEAST ONE FUNCTION OF A UNIT OF A MOTOR VEHICLE

(71) Applicant: DAV, Créteil (FR)

(72) Inventors: Jean Guillaume Chiocchi, Créteil (FR); Eric Realan, Créteil (FR); Florian Fabre, Créteil (FR); Kévin Brouty, Créteil (FR)

(73) Assignee: DAV, Créteil (FR)

( * ) Notice: Subject to any disclaimer, the term of this patent is extended or adjusted under 35 U.S.C. 154(b) by 232 days.

(21) Appl. No.: 17/798,598

(22) PCT Filed: Feb. 3, 2021

(86) PCT No.: PCT/EP2021/052485
§ 371 (c)(1),
(2) Date: Aug. 10, 2022

(87) PCT Pub. No.: WO2021/160483
PCT Pub. Date: Aug. 19, 2021

(65) Prior Publication Data
US 2023/0098529 A1    Mar. 30, 2023

(30) Foreign Application Priority Data

Feb. 11, 2020 (FR) ...................... 2001343

(51) Int. Cl.
*B60K 35/00* (2024.01)
*B60K 35/10* (2024.01)
*B60K 35/60* (2024.01)

(52) U.S. Cl.
CPC .............. *B60K 35/00* (2013.01); *B60K 35/10* (2024.01); *B60K 35/60* (2024.01);
(Continued)

(58) Field of Classification Search
CPC ........ B60K 35/00; B60K 35/10; B60K 35/60; B60K 2360/131; B60K 2360/336;
(Continued)

(56) References Cited

U.S. PATENT DOCUMENTS

| 3,653,237 A | * | 4/1972 | DuRocher | .............. | H01H 13/52 |
| | | | | | 70/264 |
| 2002/0089161 A1 | * | 7/2002 | Yamamura | ............. | B62D 1/184 |
| | | | | | 280/775 |

(Continued)

FOREIGN PATENT DOCUMENTS

| DE | 102004032335 A1 | 2/2005 |
| DE | 102007039338 A1 | 2/2009 |

(Continued)

OTHER PUBLICATIONS

International Search Report and Written Opinion in corresponding International Application No. PCT/EP2021/052485, mailed Apr. 14, 2021 (10 pages).
Office Action issued in counterpart Japanese Patent Application No. JP 2022-548810 mailed Oct. 27, 2023 (16 pages).

*Primary Examiner* — Behrang Badii
(74) *Attorney, Agent, or Firm* — Osha Bergman Watanabe & Burton LLP

(57) ABSTRACT

The invention relates to a control interface (1) for controlling at least one function of a unit of a motor vehicle, the control interface comprising a base, a control key tilting in two orthogonal directions, a gimbal interposed between the control key and the base in order to define a first and a second orthogonal tilting direction, a guide rod carried by the lower face of the control key arranged opposite the base and a cruciform guide matrix aligned in the two orthogonal tilting directions and carried by the base and arranged opposite the guide rod and cooperating with the free end
(Continued)

thereof so as to prevent tilting of the control key in a direction other than the two orthogonal tilting directions.

15 Claims, 8 Drawing Sheets

(52) U.S. Cl.
CPC ............... *B60K 2360/131* (2024.01); *B60K 2360/336* (2024.01); *B60K 2360/77* (2024.01)

(58) Field of Classification Search
CPC ........... B60K 2360/77; B60K 2360/34; B60K 37/00; G05G 2009/04718; G05G 9/047; H01H 25/06

See application file for complete search history.

(56) References Cited

U.S. PATENT DOCUMENTS

| | | | |
|---|---|---|---|
| 2003/0141025 A1* | 7/2003 | Schlecht | B60J 1/208 160/370.22 |
| 2003/0155225 A1 | 8/2003 | Kondo et al. | |
| 2019/0193509 A1* | 6/2019 | Hélot | B60K 37/00 |

FOREIGN PATENT DOCUMENTS

| | | |
|---|---|---|
| EP | 0516870 A1 | 12/1992 |
| JP | 2003-242863 A | 8/2003 |
| JP | 2010-201745 A | 9/2010 |
| JP | 2015-158970 A | 9/2015 |
| JP | 6641452 B1 | 2/2020 |

* cited by examiner

[Fig. 1]
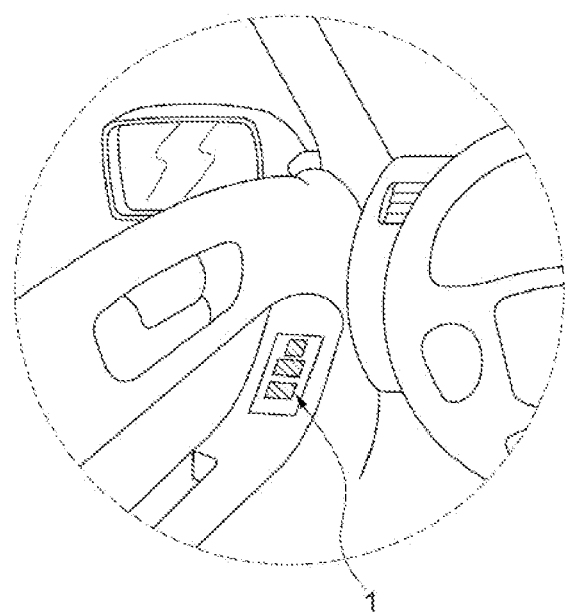

[Fig. 2]
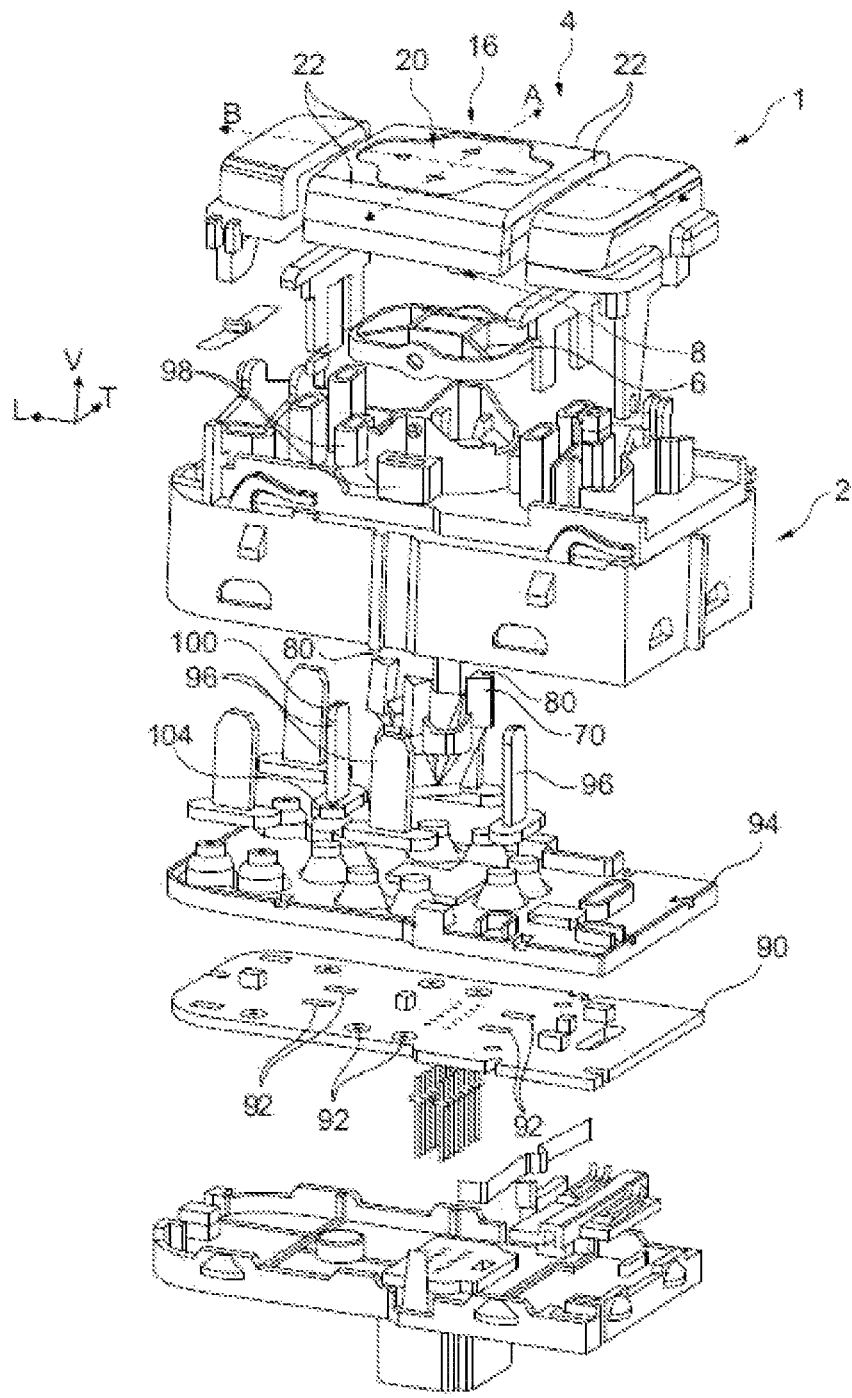

[Fig. 3]
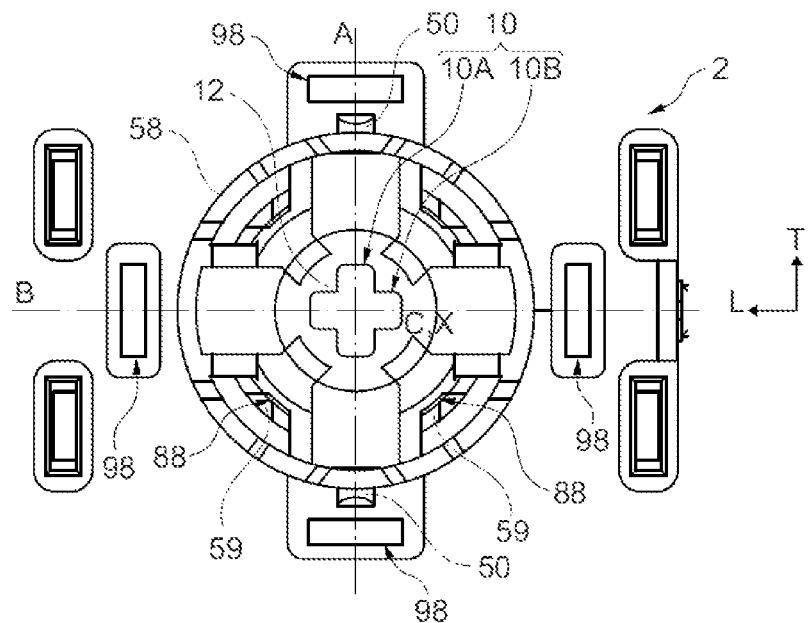
[Fig. 4]
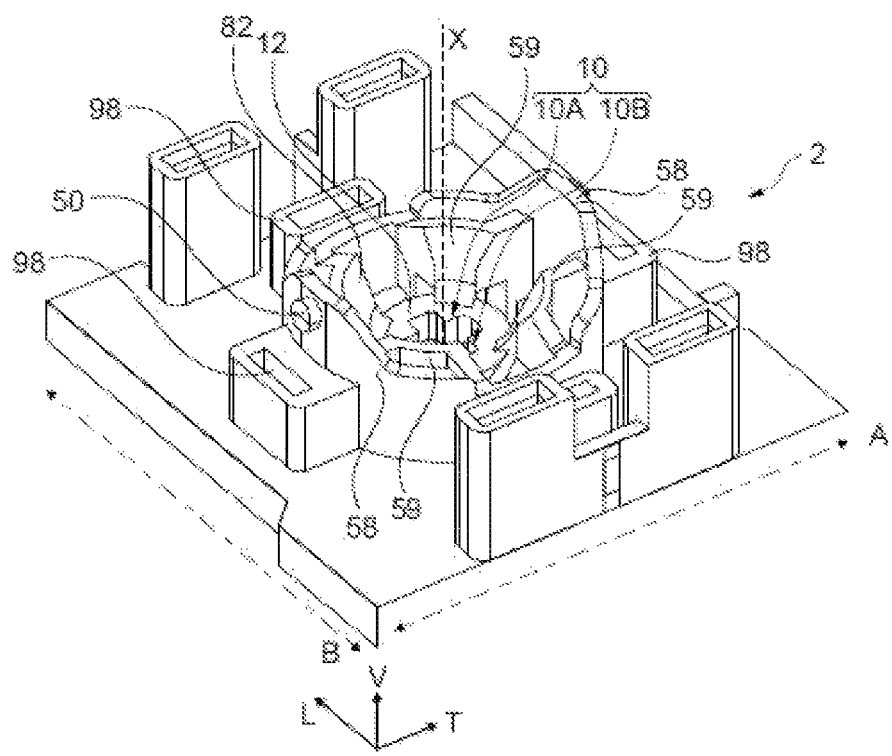

[Fig. 5]
[Fig. 6]
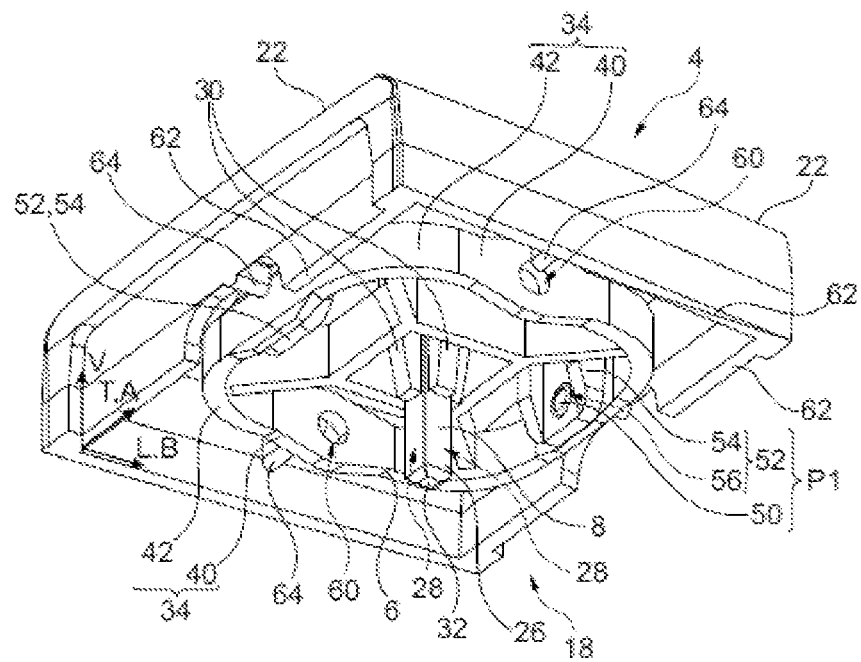

[Fig. 7]
[Fig. 8]
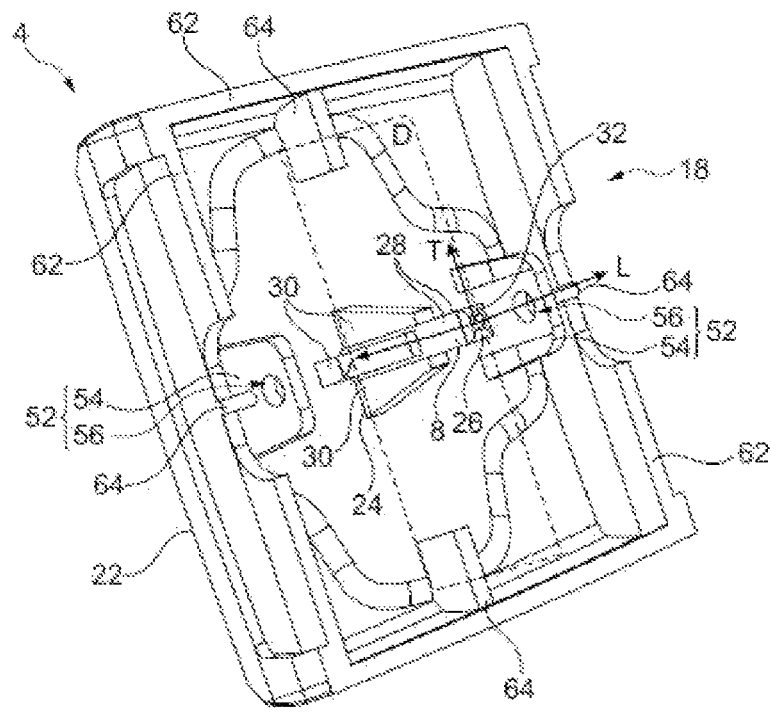

[Fig. 9]
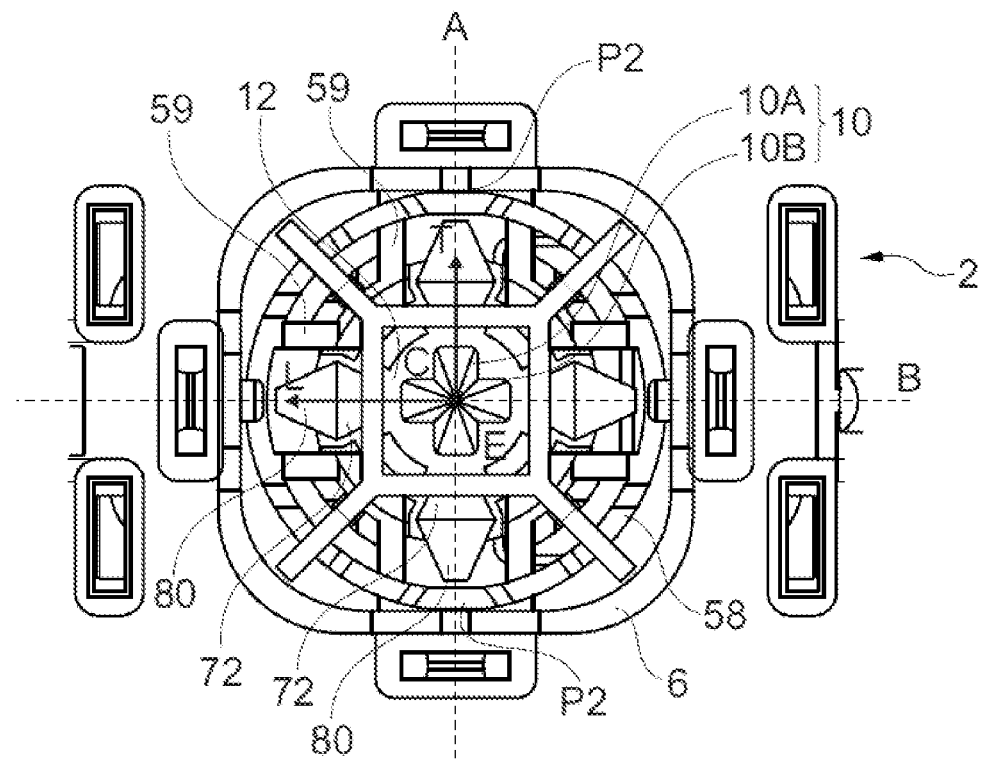
[Fig. 10]
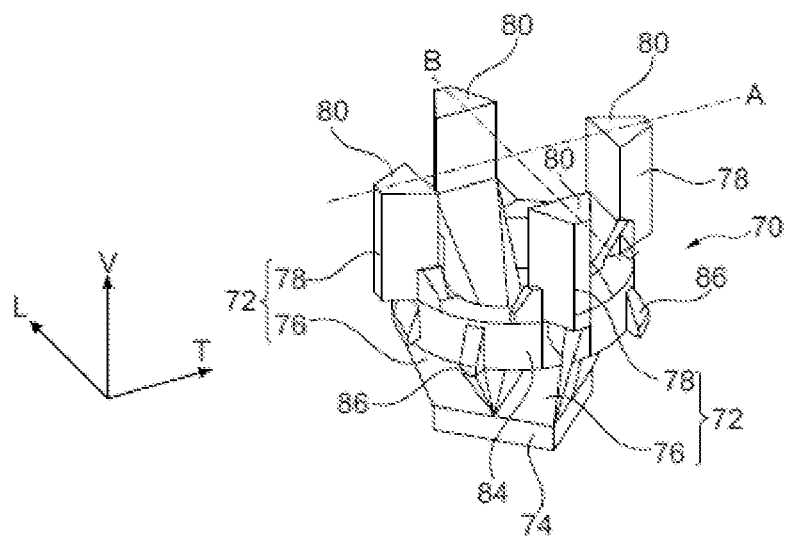

[Fig. 11]
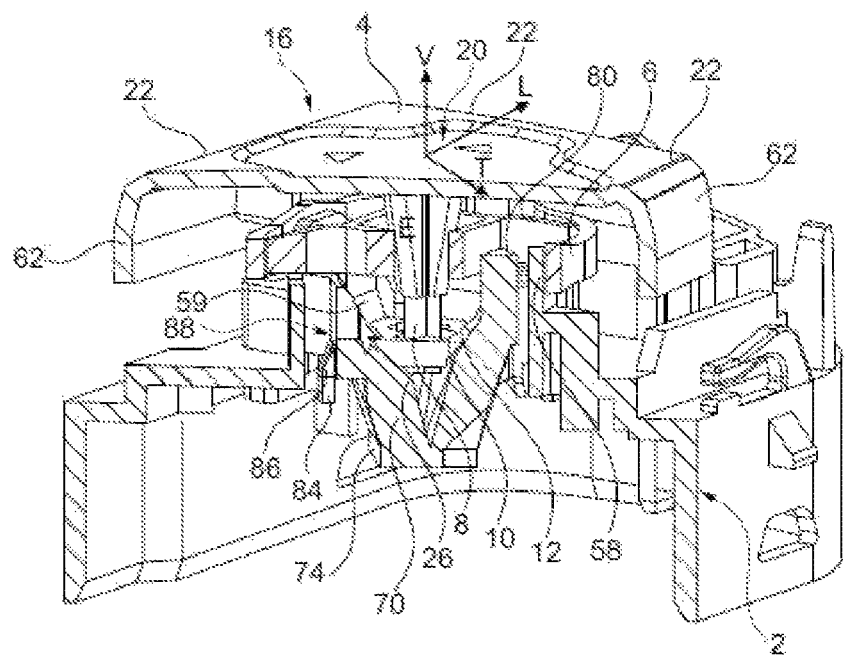
[Fig. 12]
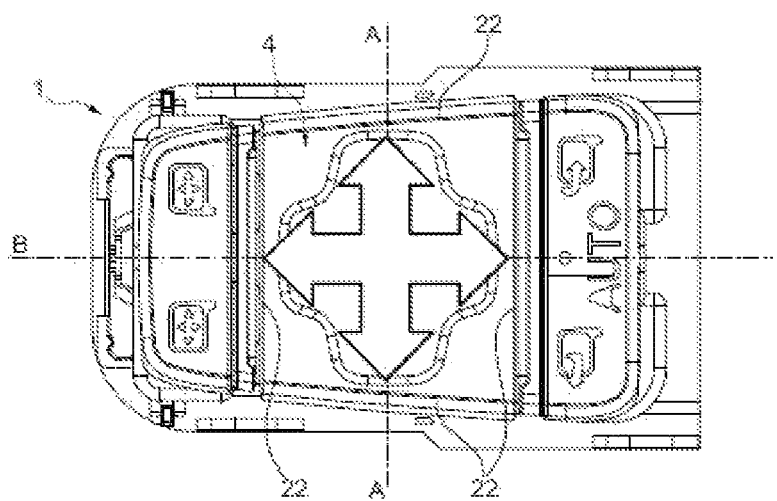

[Fig. 13]
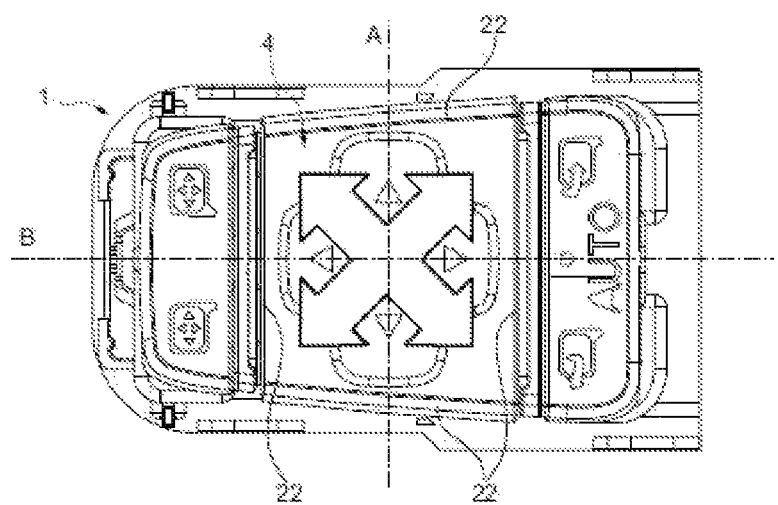

INTERFACE FOR CONTROLLING AT LEAST ONE FUNCTION OF A UNIT OF A MOTOR VEHICLE

The field of the present invention is that of electrical control interfaces for motor vehicles, such as the control interfaces that allow the positioning of the external rear-view mirrors of a motor vehicle.

In a motor vehicle, particularly in instances in which the one same vehicle is used by a number of drivers in turn, it is necessary to adjust the position of one or more external rear-view mirrors appropriately so that the driver is able to see the road behind the vehicle. Rear-view mirror control interfaces are generally employed to remotely adjust the position of the actual mirrors of the external and/or internal rear-view mirrors using electric motors. Electric switches integrated into a rear-view mirror mirror-actuation system are therefore operated in order to close electromechanical circuits that trigger electric motors tasked with moving these mirrors.

The actual mirrors of a rear-view mirror are generally able to move about two axes of inclination, these axes in most cases being mutually perpendicular. In particular, there may be an up/down first axis and a right/left second axis. The one same control interface can be used for all the adjustments. Such a control interface may notably comprise a control key configured to be rocked in each of the directions of adjustment.

However, in instances in which the control key can be rocked in a multitude of distinct directions, the control key may accidentally be pivoted about an undesired axis or direction, such as a diagonal direction, which corresponds neither to the up/down axis nor to the right/left axis. Such an event may, for example, trigger a command not desired by a user of the interface or may even force the components of the rear-view mirror control interface into a mode for which they are not designed.

It is an object of the present invention to at least partially overcome one disadvantage of the prior art.

To this end, the subject-matter of the invention is a control interface for controlling at least one function of a unit of a motor vehicle, the control interface comprising a base, a rocking control key that can be rocked in two orthogonal directions, a gimbal interposed between the control key and the base to define a first and a second orthogonal directions of rocking, a guide rod borne by the underside face of the control key arranged facing the base, and a cruciform guide template aligned with the two orthogonal directions of rocking and borne by the base and positioned facing the guide rod and collaborating with the free end thereof so as to prevent the control key being rocked in a direction other than the two orthogonal directions of rocking.

Thanks to the geometry of the components of such a control interface, a rocking of the control key in an orientation other than the two orthogonal directions of rocking is prevented, and cannot be performed. The gimbal makes it possible to define the two sole degrees of freedom of the control key with respect to the base, namely the pivoting about the two orthogonal axes of rocking. The cruciform template serves to direct the guide rod only in these orthogonal directions of rocking when the control key is pivoted, and thus enhances the guidance of said key. By combining the action of the gimbal with the directions of the arms of the cross of the cruciform template, a user of the interface is forced to pivot the control key only in the two orthogonal directions of rocking, any pivoting outside of these directions being unachievable, either accidentally or intentionally.

The invention may further comprise one or more of the following aspects taken alone or in combination:
- the control key is connected to the gimbal by means of a first pivot connection to allow the control key to pivot in the first direction of rocking;
- the base is connected to the gimbal by means of a second pivot connection to allow the control key to pivot in the second direction of rocking;
- the first or the second pivot connection is formed by at least one journal and at least one bearing collaborating with one another, one of them borne by the gimbal and the other by the control key or the base;
- the control key comprises at least one bearing collaborating with a journal borne by the gimbal to form the first pivot connection;
- the at least one bearing takes the form of a holed lug;
- the base comprises two journals each respectively collaborating with a bearing borne by the gimbal to form the second pivot connection;
- the gimbal has a peripheral edge of square overall shape and a central partition, the peripheral edge being connected to the central partition by reinforcing beams;
- the guide rod passes through the point of intersection between the axes of the two pivot connections;
- the guide rod has at least one lateral reinforcing rib;
- the free end of the guide rod has square shape in a plane of transverse cross section;
- the free end of the guide rod passes through the cruciform template;
- the cruciform template is formed as one with the base;
- the interface comprises a light guide positioned facing the underside face of the control key;
- the light guide comprises at least one clip-fastening tab configured to be housed in an opening of a retaining wall of the base so as to secure the light guide to the base;
- the interface comprises four pistons having an end in contact with the underside face of the control key;
- the pistons are able to move in rectilinear translation in the direction perpendicular to the two orthogonal directions of rocking;
- the pistons are configured so that during rocking of the control key, they activate electric switches borne by the interface; and
- the control key is is the result of a two-shot injection molding process.

BRIEF DESCRIPTION OF THE DRAWINGS

Further advantages and features of the invention will become more clearly apparent from reading the following description, given by way of illustrative and non-limiting example, and the appended drawings, in which:

FIG. 1 depicts a schematic perspective view of an interior of a motor vehicle in which the electric control interface for controlling at least one function of a unit of a motor vehicle is installed;

FIG. 2 depicts an exploded and perspective schematic view of one embodiment of the control interface of FIG. 1;

FIG. 3 depicts a view from above of a detail of the base of the control interface of FIG. 2;

FIG. 4 depicts a perspective view of a detail of the base of FIG. 3;

FIG. 5 depicts a perspective view of a first embodiment of the control key assembled with the gimbal of the control interface of FIG. 2;

FIG. 6 depicts a perspective view of the gimbal of the control interface of FIG. 2;

FIG. 7 depicts a perspective view of the underside face of the first embodiment of the control key from FIG. 5;

FIG. 8 depicts a perspective view of a second embodiment of the control key of the control interface of FIG. 2;

FIG. 9 depicts a view from above of an assembly comprising the base, the gimbal and the light guide of the control interface of FIG. 2;

FIG. 10 depicts a perspective view of the light guide of the control interface of FIG. 2, and FIG. 11 depicts a view in cross section of the control interface of FIG. 2.

FIG. 12 depicts orientations of rocking of the control key of the interface of FIG. 2.

FIG. 13 depicts orientations of rocking of the control key of the interface of FIG. 2.

In these figures, identical elements bear the same reference numerals. The longitudinal, vertical and transverse directions are designated as indicated in FIGS. 2 to 11 by the dihedron (L, V, T).

The following embodiments are examples. Although the description refers to one or more embodiments, this does not necessarily mean that each reference relates to the same embodiment, or that the features apply only to a single embodiment. Individual features of various embodiments may also be combined or interchanged in order to create other embodiments.

In the description, certain elements may be indexed, such as first element or second element. In this case, this is merely indexing for differentiating and denoting elements that are similar but not identical. This indexing does not imply that one element takes priority over another and such denominations can easily be interchanged without departing from the scope of the present description. This indexing does not imply an order in time either.

FIG. 1 shows a schematic depiction of an interface 1 for controlling at least one function of a unit of a motor vehicle, such as the mobile mirrors fitted in the external rear-view mirror units of the motor vehicle. By way of illustration, the interface 1 is positioned within reach of the driver or of the passenger, for example in a door or in the center console of the vehicle interior between the driver and passenger seat or in the vehicle interior overhead unit. The control interface 1 may of course have any orientation in space. It may for example be rotated through 180° compared with the orientation indicated in the figures, so that it can be built into the overhead unit.

The control interface 1 comprises a base 2 (FIG. 2), a rocking control key 4 able to rock in two orthogonal directions A and B, a gimbal 6 interposed between the control key 4 and the base 2, a guide rod 8 and a cruciform guide template 10, aligned with the two orthogonal directions A and B of rocking (FIGS. 3 and 4) and borne by the base 2. In FIGS. 2 to 11, the two orthogonal directions A and B correspond respectively to the transverse direction T and the longitudinal direction L.

The cruciform template 10 is for example formed as one with the base 2, as illustrated in FIGS. 3 and 4. In other words, the cruciform template 10 is an integral part of the base 2 and forms a one-piece structure with this base 2. The cruciform template 10 notably takes the form of a hole in the shape of a cross. The cruciform template 10 is thus formed by two slots 10A and 10B in an end wall 12 of circular shape secured to the base 2. The end wall 12 extends in a plane perpendicular to the vertical axis V. The slot 10A extends in the first direction of rocking A, namely parallel to the transverse direction T, while the slot 10B extends in the second direction of rocking B, namely parallel to the longitudinal direction L. The two slots 10A and 10B are notably current at their middle, thus defining the center C of the cruciform template in which may coincide with the center of the end wall 12. The slots 10A and 10B may have the same length or different lengths.

The cruciform template 10 is not visible to a user of the interface 1 because the control key 4 is mounted on the base 2 so that it fully covers the cruciform template 10 (FIG. 2). The control key 4 has an upper face 16 visible to a user of the interface 1 and an underside face 18 (FIGS. 5 and 7) positioned facing the base 2 and the cruciform template 10 so as not to be visible to a user of the interface 1.

The upper face 16 and underside face 18 of the control key 4 have a square overall shape for example. According to an unillustrated embodiment of the control key 4, the upper face 16 and lower face 18 thereof may be of round shape or even cross-shape, the arms of the cross being oriented in the orthogonal directions A and B of rocking.

According to one embodiment of the control key 4, which embodiment is illustrated in FIG. 2, the upper face 16 may bear marks in the form of translucent arrows such as "<", ">", "▲" and "▼" indicating the orthogonal directions A and B in which the control key 4 may be rocked. Optionally, the upper face 16 may have a relief 20, such as a depression or a protruding pattern designed to direct a user's digit towards the edges 22 of the control key 4 so as to provide said user with a haptic indication of the directions of rocking A and B.

The guide rod 8 is borne by the underside face 18 of the control key 4 and is arranged facing the base 2. The guide rod 8 notably extends in the vertical direction V when the control key is in a position of rest, which is to say in the absence of any interaction between the user and the control interface 1.

One end 24 (FIG. 7) of the guide rod 8 is for example secured to the underside face 18 of the control key 4. The guide rod 8 also has a free end 26. According to one embodiment of the control key 4, which embodiment is illustrated notably in FIGS. 5 and 7, the free end 26 of the guide rod 8 has a square shape in a plane of transverse cross section formed by the longitudinal axis L and the transverse axis T. The free end 26 of the guide rod 8 is therefore of parallelepipedal shape and has four rectangular lateral faces 28. In this particular instance, the entirety of the guide rod 8 may be of parallelepipedal shape and have four rectangular lateral faces 28 that extend along the entire length of the guide rod 8.

According to the embodiment of the guide rod 8 that is illustrated in FIGS. 5 and 7, the guide rod 8 comprises at least one lateral reinforcing rib 30 which extends over at least part of the total length of the guide rod 8. The guide rod 8 may thus display two distinct portions: a first portion proximate to the underside face 16, this first portion being reinforced by the at least one lateral reinforcing rib 30, and a second portion which corresponds to the free end 26 of the guide rod 8, this second portion being delimited by the four rectangular lateral faces 28 and a blunted endpiece 32.

The guide rod 8 more particularly comprises between one and four lateral reinforcing ribs 30 where each are inclined in the direction of their length, giving them a triangular overall shape. The base of the triangular reinforcing ribs 30 is, for example, secured to the underside face 18 of the control key 4. In the particular instance in which the guide rod 8 comprises four lateral reinforcing ribs 30, namely one lateral reinforcing rib 30 per rectangular lateral face 28 of the guide rod 8, the built-in end 24 of the guide rod 8 is cross-shaped in a plane of transverse cross section formed by the longitudinal axis L and the transverse axis T at the level of the underside face 18.

According to another embodiment of the control key 4', which is illustrated notably in FIG. 8, the guide rod 8' may have a cross shape in a plane of transverse section tangential to the underside face 18. This embodiment notably makes it possible to dispense with the lateral reinforcing ribs 30.

In both of the embodiments of the control key 4 and 4' illustrated in FIGS. 7 and 8 respectively, the control key 4 or 4' is the result of a two-shot injection molding process also known as "2K injection molding". This injection molding process makes it possible to combine two different plastics materials or two different colors when producing the one same end product. Thanks to this two-shot injection molding process, a control key 4 or 4' with different colors or different degrees of hardness is obtained in a single injection-molding process. This choice of process thus proves to be very economical and effective because it makes it possible to dispense with an assembly step that might be needed.

The control key 4 is mounted with the ability to move in pivoting relative to the base 2. More specifically, the gimbal 6 interposed between the control key 4 and the base 2 (FIG. 2) defines a first and a second orthogonal direction A and B of rocking in concert with the cruciform template 10. According to one embodiment of the gimbal 6 illustrated notably in FIG. 6, the gimbal 6 has a peripheral edge 34 of square overall shape and a central partition 36, the peripheral edge 34 being connected to the central partition 36 by reinforcing beams 38. More specifically, the peripheral edge 34 has four straight segments 40 joined together by rounded fillets 42. The central partition 36 is also square in shape and has four straight portions 44 joined together such that their ends form corners 46 at right angles. Four reinforcing beams 38 extend from the outside of the corners 46 of the central partition 36 as far as the interior face of the rounded fillets 42 of the peripheral edge 34. The reinforcing beams 38 thus extend in the diagonal directions of the squares formed by the peripheral edge 34 and the central partition 36. According to an unillustrated embodiment of the gimbal 6, the peripheral edge 34 and/or the central partition 36 is/are circular in shape.

The gimbal 6 is connected on the one hand to the control key 4 (FIG. 5) and on the other hand to the base 2 (FIG. 9). More specifically, the control key 4 is connected to the gimbal 6 by means of a first pivot connection P1 to allow the control key 4 to pivot in the first direction A of rocking. Similarly, the base 2 is connected to the gimbal 6 by means of a second pivot connection P2 to allow the control key 4 to pivot in the second direction B of rocking.

In FIG. 5, the axis of the first pivot connection P1 (indicated in dotted line) between the control key 4 and the gimbal 6 is parallel to the longitudinal direction L, whereas in FIG. 9, the axis of the second pivot connection P2 between the base 2 and the gimbal 6 is parallel to the transverse direction T. The axes of the first and second pivot connections P1 and P2 are mutually orthogonal and correspond to the directions of rocking A and B.

In general, the first or the second pivot connection P1, P2 is formed by at least one journal 50 and at least one bearing 52 collaborating with one another, one of them borne by the gimbal 6 and the other by the control key 4 or the base 2. In other words, these two pivot connections P1 and P2 allow the control key 4 to be rocked with respect to the base 2 in the directions of rocking A and B thanks to the collaboration between the journals 50 and the bearings 52, these journals 50 and these bearings 52 being borne by the gimbal 6, by the control key 4 and by the base 2.

Thus, according to one embodiment of the control interface 1, which embodiment is illustrated notably in FIG. 5, the underside face 18 of the control key 4 comprises at least one bearing 52 collaborating with a journal 50 borne by the gimbal 6 to form the first pivot connection P1. The at least one bearing 52 furthermore has the shape of a holed lug 54, which is to say that the bearing 52 in the form of a holed lug 54 can be likened for example to a small-thickness rectangular fin that has a hole 56 passing through its center. The underside face 18 of the control key 4 may comprise two bearings 52, which is to say to holed lugs 54. In that case, the holed lugs 54 are for example oriented so that they face one another, such that the holes 56 are aligned along the one same axis parallel to the longitudinal direction L, thus defining the axis of the first pivot connection P1.

Furthermore, the holed lugs 54 are notably each positioned proximate to two opposing edges 22 of the control key 4, as illustrated in FIGS. 5 and 7. The holed lugs 54 may be positioned symmetrically on the underside face 18 of the control key 4, being for example positioned symmetrically one on each side of a transverse plane D formed by the vertical axis V and the transverse axis T (FIG. 7).

The two holed lugs 54 borne by the underside face 18 of the control key 4 thus form bearings 52 configured to each respectively accommodate a journal 50 borne by the gimbal 6. That implies that the gimbal 6 bears two journals 50, as illustrated for example in FIG. 6. These journals 50 are, for example, protuberances of cylindrical or hemispherical shape borne by the peripheral edge 34 of the gimbal 6.

More specifically, the two journals 50 are each situated in the middle of a straight segment 40 of the peripheral edge 34 of the gimbal 6, these straight segments 40 being opposite one another, which is to say not connected by a single rounded fillet 42. According to the embodiment of the gimbal 6 illustrated notably in FIG. 6, the journals 50 are borne by the straight segments 40 which are oriented parallel to the transverse axis T, such that the respective axes of revolution R of the cylindrical journals 50 coincide with the longitudinal axis L. In addition, the two journals 50 are borne by the interior face of the peripheral edge 34 of the gimbal 6, which is to say the face directed toward the central partition 36. However, according to an embodiment that is not illustrated, the journals 50 may be borne by the exterior face of the peripheral edge 34 of the gimbal 6.

Similarly, the base 2 comprises two journals 50 (FIG. 3) each respectively collaborating with a bearing 52 borne by the gimbal 6 (FIG. 6) to form the second pivot connection P2 (FIG. 9). On the one hand, according to the embodiment of the base 2 that is illustrated in FIG. 4, the journals 50 of the base 2 can be likened to cylindrical or hemispherical protuberances borne by a mounting wall 58 of the base 2. The mounting wall 58 is, for example, a cylindrical surround which shares with the end wall 12 the one same axis of revolution X which is parallel to the vertical direction V and passes through the center C of the cruciform template 10 (FIG. 3). The mounting wall 58 and the end wall 12 are connected to one another by retaining walls 59. There are notably four retaining walls 59 positioned around the axis of revolution X and inclined with respect to this axis, so as to form a discontinuous funnel, as illustrated for example in FIG. 4. The retaining walls 59 extend in diagonal directions of the cruciform template 10. The journals 50 are notably borne by the exterior face of the mounting wall 58.

On the other hand, the gimbal 6 (FIG. 6) has two bearings 52 in the form of two cylindrical orifices 60 forming openings in two straight segments 40 of the gimbal 6 which are opposite one another. These straight segments 40 are not the same as the ones bearing the journals 50 of the first pivot connection P1. The orifices 60 form openings in the straight segments 40 which are oriented parallel to the longitudinal axis L, so that the transverse axis T can pass through their respective centers.

The journals 50 and the orifices 60 borne by the gimbal 6 are notably situated in the middle of the straight segments 40 that bear them, such that the axes of the first and second pivot connection P1, P2 intersect at the center of the gimbal 6, forming a point of intersection E as illustrated in FIG. 6.

In an unillustrated embodiment of the gimbal 6, the latter comprises only journals 50, and it is then the base 2 and the control key 4 that bear the bearings 52 configured to collaborate with the journals 50 of the gimbal 6 to form the first and second pivot connections P1, P2.

According to another unillustrated embodiment of the gimbal 6, the latter comprises only bearings 52, which is to say that each of the four straight segments 40 has an orifice 60. It is then the base 2 and the control key 4 that bear the journals 50 configured to collaborate with the bearings 52 of the gimbal 6 to form the first and second pivot connections P1, P2.

Independently of the configuration chosen for forming the first and second pivot connections P1, P2 using journals 50 and bearings 52, the gimbal 6 is mounted on the mounting wall 58 of the base 2 and covered by the control key 4, as illustrated in FIG. 11. In other words, the upper surface 16 of the control key 4 hides the gimbal 6 and the mounting wall 58 from the sight of a user of the control interface 1.

Advantageously, the control key 4 may comprise lateral sides 62 (FIG. 5) delimiting the edges 22 of the upper face 16 and of the lower face 18 of the control key 4. These lateral sides 62 are for example positioned in such a way that they form, with the underside face 18, a cavity intended to accommodate the gimbal 6 interposed between the control key 4 and the base 2, such that the guide rod 8 passes through the point of intersection E between the axes of the two pivot connections P1 and P2, as illustrated in FIG. 11.

Moreover, the underside face 18 of the control key 4 may comprise four protrusions 64 (FIG. 7) projecting in the direction of the vertical axis V. The protrusions 64 are more particularly positioned on the axes of the first and second pivot connections P1 and P2 and notably situated in the vicinity of the edges 22 of the control key 4. They are, for example, formed as one with the lateral sides 62 of the control key 4. The protrusions 64 situated on the lateral sides 62 in the vicinity of a bearing 52 in the form of a holed lug 54 have, for example, a shorter span than the other two protrusions 64, as illustrated in FIG. 7.

In addition, the control interface 1 comprises a light guide 70 positioned facing the underside face 18 of the control key 4, as illustrated in FIG. 11. A light guide 70 is a translucent component allowing rays of light to be guided from the one same light source toward one or more distinct windows. Such a light guide 70 proves to be particularly beneficial in the case of low lighting inside the interior of the motor vehicle.

According to one embodiment of the light guide 70, illustrated in FIG. 10, it comprises four kinked branches 72 secured to a common baseplate 74 that is square in shape. The kinked branches 72 each comprise a portion 76 proximal to the common baseplate 74, and a straight portion 78. The portions 76 proximal to the common baseplate 74 are, for example, inclined with respect to the bearing surface of the common baseplate 74 so that each extends in one of the directions of rocking A or B. The straight portions 78 extend parallel to the vertical direction V.

The ends of these straight portions 78 form free ends 80. In other words, the trapezoidal free ends 80 are situated facing the underside face 18 of the control key 4 and are notably situated beneath translucent marks in the form of arrows such as "<", ">", "▲" and "▼" on the upper face 16 of the control key 4. This is more particularly visible in FIG. 11. The kinked branches 72 are situated in spaces formed by the retaining walls 59, the mounting wall 58 and the end wall 12 of the base 2, as illustrated more particularly in FIG. 9.

According to the embodiment of the light guide 70 that is illustrated in FIG. 10, this guide comprises a cylindrical bearing ring 84 which bears the junction between the portions 76 proximal to the common baseplate 74 and the straight portions 78 of the kinked branches 72. Moreover, the light guide 70 comprises at least one clip-fastening tab 86 configured to be housed in an opening 88 (FIG. 11) of one of the retaining walls 59 of the base 2 so as to secure the light guide 70 to the base 2. The light guide 70 notably comprises four clip-fastening tabs 86 in the form of triangular protuberances positioned at regular angular intervals on the exterior face of the bearing ring 84. The underside surfaces of the clip-fastening tabs 86 are thus bearing surfaces which, by contact with the openings 88 in the retaining walls 59, hold the light guide 70 in the base 2.

According to the embodiment of the interface that is illustrated in FIG. 2, the control interface 1 comprises for example an electronic board 90 which bears electric switches 92. The electric switches 92 are, for example, push-button switches. The electronic board 90 is notably covered by a deformable and elastic membrane 94.

The control interface 1 moreover comprises four pistons 96 positioned between the control key 4 and the membrane 94. The pistons 96 can be moved in rectilinear translation in the direction perpendicular to the two orthogonal directions A and B of rocking, namely parallel to the vertical axis V in the case of FIG. 2. The pistons 96 are partially arranged in rectilinear guides 98 of the base 2 which are configured to direct the movements of the pistons 96 along the vertical axis V, in the direction of the electronic board 90 and vice versa.

A piston 96 is, for example, T-shaped, and has a first end 100 in contact with one of the protrusions 64 of the underside face 18 of the control key 4. A piston 96 also has a second end 102 which is flat and in contact with the membrane 94. The flat second end 102 is more particularly positioned above one of the electric switches 92. The electric switches 92 may be paired and are then associated in pairs on the electronic board 90. The flat shape of the second end 104 of the piston 96 thus allows the two electric switches 92 situated side-by-side to be covered simultaneously. The pistons 96 are configured so that during rocking of the control key 4, they activate the electric switches 92 borne by the control interface 1.

In order to adjust the positions of the actual mirrors within an external rear-view mirror, the user uses a digit to press on one of the marks "<", ">", "▲" or "▼" on the upper face 16 or on one of the edges 22 of the control key 4. As a result, the control key 4 rocks in one of the directions of rocking A or B and the free end 26 of the guide rod 8 is engaged in one of the two slots 10A or 10B of the cruciform template 10. The free end 26 is configured to collaborate with the cruciform guide template 10 borne by the base 2 so as to prevent the control key 4 from rocking in a direction other than the two orthogonal directions A and B of rocking. For this purpose, the free end 26 of the guide rod 8 may notably pass through the cruciform template 10 (FIG. 11) such that when the control key 4 is rocked with respect to the base 2 in one of the directions of rocking A or B, the free end 26 of the guide rod 8 remains inside the cruciform template 10.

The rectangular lateral faces 28 of the free end 26 of the guide rod 8 through complementing shapes allow better collaboration with the slots 10A and 10B delimiting the cruciform template 10. Specifically, because of the planar connection formed between the rectangular lateral faces 28 of the free end 26 of the guide rod 8 and the interior faces of the slots 10A and 10B, the clearance between these components is more precise than if the guide rod 8 were of cylindrical shape, because a slideway connection is more advantageous and practical here than a rectilinear linear connection.

When the control key 4 pivots in a given direction of rocking A or B, the free end 26 of the guide rod 8 engages in the slot 10A or 10B that runs parallel to this direction of rocking A or B, but in the opposite sense of this direction.

Thus, when the user presses on the ">" mark, the control key 4 pivots in the first direction of rocking A, in the positive sense of the transverse direction T. Moreover, the free end 26 of the guide rod 8 engages in the slot 10A running parallel to the transverse axis T, but in the negative sense of direction of this axis.

When the user presses on the "<" mark, the control key 4 pivots in the first direction of rocking A, in the negative sense of the transverse direction T. Moreover, the free end 26 of the guide rod 8 engages in the slot 10A running parallel to the transverse axis T, but in the positive sense of direction of this axis.

In these two first scenarios, the control key 4 pivots about the point E of the first pivot connection P1 with respect to the gimbal 6 which then remains fixed relative to the base 2.

When the user presses on the "▲" mark, the control key 4 pivots in the second direction of rocking B, in the positive sense of the longitudinal direction L. In addition, the free end 26 of the guide rod 8 engages in the slot 10B running parallel to the longitudinal direction L, but in the negative sense of direction of this axis.

When the user presses on the "▼" mark, the control key 4 pivots in the second direction of rocking B, in the negative sense of the longitudinal direction L. In addition, the free end 26 of the guide rod 8 engages in the slot 10B running parallel to the longitudinal direction L, but in the positive sense of direction of this axis.

In these two second scenarios, the assembly formed by the control key 4 and the gimbal 6 pivots about the point E of the second pivot connection P2 relative to the base 2.

The four possible orientations of rocking are indicated by arrows in FIG. 12.

When the user presses on a zone between two marks "<", ">", "▲" or "▼", such as a corner of the control key 4, the latter is unable to pivot in a diagonal direction indicated by the arrows in FIG. 13, because the structure of the pivot connections P1 and P2 between the gimbal 6, the control key 4 and the base 2 do not allow such a direction of rocking. In addition, the slots 10A and 10B of the cruciform templates 10 do not allow the guide rod 8 to engage in a diagonal direction. In other words, the guide rod 8 likewise opposes a pivoting of the control key 4 in a direction other than the two directions of rocking A or B.

When the user presses on one of the edges 22 of the control key 4 in order to make this key pivot in the chosen direction of rocking A or B, the protrusion 64 situated beneath the mark indicating the chosen direction presses on the first end 100 of the piston 96 with which it is in contact, and thus pushes the piston 96 toward the electronic board 90. The second end 102 of the piston 96 therefore deforms the membrane 94 covering the electronic board 90 which bears the electric switches 92.

These electric switches 92 more particularly allow the closing of the electromechanical circuits that trigger electric motors tasked with moving the actual mirrors within the exterior rear-view mirrors. The movement of a piston 96 toward the electronic board 90 thus makes the electrical connection between switching contacts (not depicted in the figures) of the electric switches 92.

The switching contacts are, for example, connected to a controller (not depicted in the figures) which controls a device, such as an electric motor, configured to adjust the position of an actual mirror of a rear-view mirror. Depending on the electrical connection, the electric motor controls the positioning by rotating the actual mirror within the rear-view mirror. For example, if the user presses the ">" mark, the actual mirror pivots in the clockwise direction, whereas if the user presses the "<" mark, the actual mirror then pivots in the counterclockwise direction.

Thus, the control interface 1 provides control of a motor vehicle unit such as the mirrors of the exterior rear-view mirrors by manipulating a control key 4, while at the same time preventing this control key 4 from being rocked in an orientation other than the two orthogonal directions of rocking A and B dictated by the cruciform template 10 and by the pivot connections P1 and P2 defined to a large extent by the gimbal 6.

The invention claimed is:

1. An interface for controlling at least one function of a unit of a motor vehicle, the control interface comprising:
    a base;
    a rocking key that can be rocked in two orthogonal directions;
    a gimbal interposed between the control key and the base to define a first and a second orthogonal direction of rocking;
    a guide rod borne by the underside face of the control key arranged facing the base;
    a cruciform guide template aligned with the two orthogonal directions of rocking and borne by the base and positioned facing the guide rod and collaborating with the free end thereof so as to prevent the control key being rocked in a direction other than the two orthogonal directions of rocking.

2. The control interface as claimed in claim 1, wherein the control key is connected to the gimbal by means of a first pivot connection to allow the control key to pivot in the first direction of rocking, and in that the base is connected to the gimbal by of a second pivot connection to allow the control key to pivot in the second direction of rocking.

3. The control interface as claimed in claim 2, wherein the first or the second pivot connection is formed by at least one journal and at least one bearing collaborating with one another, one of them borne by the gimbal and the other by the control key or the base.

4. The control interface as claimed in claim 3, wherein the control key comprises at least one bearing collaborating with a journal borne by the gimbal to form the first pivot connection, and in that the at least one bearing takes the form of a holed lug.

5. The control interface as claimed in claim 3, wherein the base comprises two journals each respectively collaborating with a bearing borne by the gimbal to form the second pivot connection.

6. The control interface as claimed in claim 1, wherein the gimbal has a peripheral edge of square overall shape and a central partition, the peripheral edge being connected to the central partition by reinforcing beams.

7. The control interface as claimed in claim 2, wherein the guide rod passes through the point of intersection between the axes of the two pivot connections.

8. The control interface as claimed in claim 1, wherein the guide rod has at least one lateral reinforcing rib.

9. The control interface as claimed in claim 1, wherein the free end of the guide rod has a square shape in a plane of transverse cross section.

10. The control interface as claimed in claim 1, wherein the free end of the guide rod passes through the cruciform template.

11. The control interface as claimed in claim 1, wherein the cruciform template is formed as one with the base.

12. The control interface as claimed in claim 1, further comprising: a light guide positioned facing the underside face of the control key.

13. The control interface as claimed in claim 12, wherein the light guide comprises at least one clip-fastening tab configured to be housed in an opening of a retaining wall of the base so as to secure the light guide to the base.

14. The control interface as claimed in claim 1, further comprising four pistons having an end in contact with the underside face (18) of the control key, the pistons being able to move in rectilinear translation in the direction perpendicular to the two orthogonal directions of rocking and being configured so that during rocking of the control key, they activate electric switches borne by the interface.

15. The control interface as claimed in claim 1, wherein the control key is the result of a two-shot injection molding process.

* * * * *